(12) United States Patent
Balakrishnan et al.

(10) Patent No.: US 8,699,785 B2
(45) Date of Patent: Apr. 15, 2014

(54) TEXTURE IDENTIFICATION

(75) Inventors: Sathya Bama Balakrishnan, Tirunelveli (IN); Raju Srinivasan, Madurai (IN); Abhaikumar Varadhan, Madurai (IN)

(73) Assignee: Thiagarajar College of Engineering, Madurai, ID (US)

( * ) Notice: Subject to any disclaimer, the term of this patent is extended or adjusted under 35 U.S.C. 154(b) by 638 days.

(21) Appl. No.: 12/938,193

(22) Filed: Nov. 2, 2010

(65) Prior Publication Data

US 2012/0106830 A1 May 3, 2012

(51) Int. Cl.
| | | |
|---|---|---|
| G06K 9/00 | (2006.01) | |
| G06T 7/40 | (2006.01) | |
| G06T 15/04 | (2011.01) | |
| G06F 1/16 | (2006.01) | |
| G01S 7/41 | (2006.01) | |

(52) U.S. Cl.
CPC .................. *G06T 7/402* (2013.01); *G06T 15/04* (2013.01); *G06F 1/1694* (2013.01); *G01S 7/412* (2013.01)
USPC ....................................................... 382/154

(58) Field of Classification Search
CPC ....... G06T 7/402; G06T 15/04; G06F 1/1694; G01S 7/412
USPC ........................................................ 382/154
See application file for complete search history.

(56) References Cited

U.S. PATENT DOCUMENTS

| 5,353,355 | A | 10/1994 | Takagi et al. | |
| 6,795,082 | B2 * | 9/2004 | Wakabayashi | 345/582 |
| 7,064,767 | B2 * | 6/2006 | Matsumoto et al. | 345/582 |

OTHER PUBLICATIONS

Haley et al., "Rotation-invariant Texture Classification Using a Complete Space-frequency Model," IEEE Transactions on Image Processing, Feb. 1999, vol. 8, Issue 2, pp. 255-269.*

Cheong et al., "Textile Recognition Using Tchebichef Moments of Co-occurrence Matrices", Lecture Notes in Computer Science, 2008, 5226, 1017-1024.

Fountain et al., "Efficient Rotation Invariant Texture Features for Content-Based Image Retrieval", Pattern Recognition, Nov. 1998, 31(11), 1725-1732.

Sheldon et al., "Design of an On-Line Computer-Based Textile Information Retrieval System", Fibers and Polymers Division, Mechanical Engineering Department, Massachusetts Institute of Technology, Cambridge, Massachusetts, U.S.A. Textile Research Journal. Jan. 1968, 38(1) 81-100.

Sheng et al., "Experiments on pattern recognition using invariant fourier-Mellin descriptors", J. Opt. Soc. Am. A., Jun. 1986, 3(6), 771-776.

Wang et al., "Rotational Invariance Based on Fourier Analysis in Polar and Spherical Coordinates", IEEE transactions on pattern analysis and machine intelligence, Sep. 2009, 31(9), 1715-1722.

(Continued)

*Primary Examiner* — Edward Park
(74) *Attorney, Agent, or Firm* — Woodcock Washburn LLP

(57) ABSTRACT

Technologies are generally described for determining a texture of an object. In some examples, a method for determining a texture of an object includes receiving a two-dimensional image representative of a surface of the object, estimating a three-dimensional (3D) projection of the image, transforming the 3D projection into a frequency domain, projecting the 3D projection in the frequency domain onto a spherical co-ordinate system, and determining the texture of the surface by analyzing spectral signatures extracted from the 3D projection on the spherical co-ordinate system.

20 Claims, 9 Drawing Sheets

(56) References Cited

OTHER PUBLICATIONS

Yosuke et al., "Textile Image Retrieval Using Specialists' Knowledge", Proceedings of the Annual Conference on JSAI (CD-ROM), 2005, 19, 2D2-04.

Bashar et al., "Image Retrieval by Pattern Categorization Using Wavelet Domain Perceptual Features with LVQ Neural Network," Pattern Recognition Letters, Nov. 2005, vol. 26, Issue 15, pp. 2315-2335.

Chantler et al., "Rotation Invariant Classification of 3D Surface Textures Using Photometric Stereo and Surface Magnitude Spectra," Proceedings of British Machine Vision Conference, 2000, pp. 486-495.

Manjunath et al., "Texture Features for Browsing and Retrieval of Image Data," IEEE Transactions on Pattern Analysis and Machine Intelligence, Aug. 1996, vol. 18, No. 8, pp. 837-842.

Tuceryan et al., Chapter 2.1 "Texture Analysis," Handbook of Pattern Recognition and Computer Vision, 1993, pp. 235-276.

Woodham, "Photometric Method for Determining Surface Orientation from Multiple Images," Optical Engineering, Jan./Feb. 1980, vol. 19, No. 1, pp. 139-144.

Zhang et al., "Brief Review of Invariant Texture Analysis Methods," Pattern Recognition, Mar. 2002, vol. 35, Issue 3, pp. 735-747.

Zhang et al., "Content-based Image Retrieval Using Gabor Texture Features," International Conference on Pattern Recognition, 2006.

Zhang et al., "New Texture Signatures and Their Use in Rotation Invariant Texture Classification," Chinese Academy of Sciences, 2002, 4 pages.

\* cited by examiner

TEXTURE IDENTIFICATION

BACKGROUND

Applications currently exist that analyze an image of an object to extract information about its texture. The extracted texture information may then be used by other applications. For example, the texture information serves as a low level descriptor for content-based indexing and retrieving. Content based indexing and retrieving is often used in several industries such the textile industry, tile industry, crystal industry and the like.

Current content-based retrieval techniques begin by analyzing photographic images of the object. Typically, a first level of analysis is performed manually by an operator. Such operators visually examine the image to determine the texture of the object. However, the determination of the texture is not very accurate. In addition, the operator may not accurately perceive a texture image that has undergone geometrical transformation such as rotation or scaling.

Numerous techniques have been developed to consider the geometric transformation of the image while extracting the texture information. Rotation invariant feature extraction is one such technique that takes into consideration the rotation of the image while extracting the feature of the texture. However, most rotation invariant feature extraction techniques are based on image rotation and do not take into account physical surface rotation of the image.

Surface rotation invariant techniques have been developed to address the surface rotation parameters related to image rotation. However, most surface rotation invariant techniques require at least three images for processing thereby increasing processing complexity and associated costs. In addition, in most cases three images may not be available for processing.

SUMMARY

Briefly, according to one embodiment of the present disclosure, a method for determining a texture of an object is provided. The method includes receiving a two-dimensional image representative of a surface of the object and estimating a three-dimensional (3D) projection of the image. The 3D projection is transformed into a frequency domain and then projected on to a spherical co-ordinate system. The texture of the surface is determined by analyzing spectral signatures extracted from the 3D projection on the spherical co-ordinate system.

In another embodiment, a system for determining a texture of an object is provided. The system includes a processor configured to access a two-dimensional image representative of a surface of the object and estimate a three-dimensional (3D) projection of the image. The 3D projection is transformed into a frequency domain, and projected on to a spherical co-ordinate system. The processor is further configured to determine the texture of the surface by analyzing spectral signatures extracted from the 3D projection on the spherical co-ordinate system. The system further includes memory configured to store several reference texture images.

In another embodiment, a method for determining a texture of an object is provided. The method includes receiving a two-dimensional (2D) representative of a surface of the object, calculating several parameters for the image, and classifying the surface into at least one texture type from a set of texture types. The texture type is based on the calculated parameters and each texture type comprises corresponding reference spectral signatures. The method further comprises generating spectral signatures of the surface and determining the texture of the surface from the spectral signatures.

In another embodiment, a system for determining a texture of an object is provided. The system includes a processor configured to access a two-dimensional (2D) representative of a surface of the object, calculate a plurality of parameters for the image, and classify the surface into at least one texture type from a plurality of texture types. The texture type is based on several parameters and each texture type includes several reference spectral signatures. The processor is further configured to generate spectral signatures of the surface and determine the texture of the surface from the spectral signatures. The system further includes memory circuitry configured to store a plurality of reference texture images, each reference texture image having a corresponding reference spectral signature.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF ILLUSTRATIVE EMBODIMENTS

Figure 1:
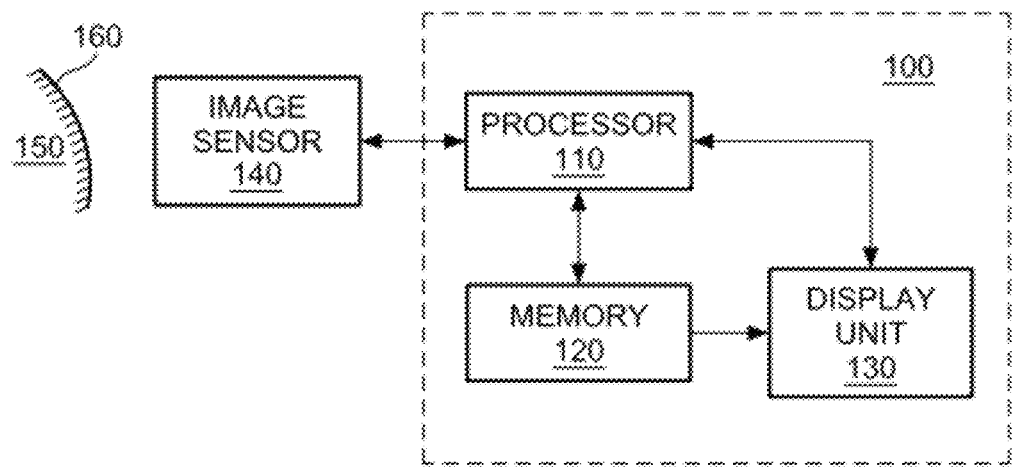
FIG. 1 is a block diagram of an illustrative embodiment of a texture identification system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments are generally directed to determining a texture of an object. The following description is with reference to texture determining applications as used in industries such as the textile industry, however it should be understood that the techniques described herein may be applied in various other applications used in the tiles industry, crystal industry and the like.

FIG. 1 is a block diagram of an illustrative embodiment of a texture identification system 100. As depicted, the texture identification system 100 includes a processor 110, a memory 120 and a display unit 130. FIG. 1 further depicts an image sensor 140 and an object 150. The depicted components are described in further detail below.

The processor 110 may be configured to access an image of the object 150. In one embodiment, the image is a two dimensional representation of a surface 160 of the object. Examples of the object 150 include fabrics, carpets, tiles, crystals and the like. Depending on the implementation, the processor 110 may be a microprocessor or Central Processing Unit (CPU). In other implementations, the processor 110 may be an Application Specific Integrated Circuit (ASIC), a Field Programmable Gate Array (FPGA), a digital signal processor (DSP), or other integrated formats.

The image sensor 140 may be configured to capture an image of the object 150. In one embodiment, the image sensor 140 is a digital camera. It may be noted that the processor 110 may be configured to access the image from the image sensor 140, the memory 120 or from an external memory device (not shown).

The memory 120 may be configured to maintain (e.g., store) reference images with corresponding reference texture information. In one embodiment, each reference image is represented in the form of reference spectral signatures. In a further embodiment, the various reference images stored in the memory 120 are classified into a corresponding texture type. As used herein, a reference spectral signature corresponds to texture signatures extracted from the frequency spectrum of the reference image.

The memory 120 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, or the like or any combination thereof.

The processor 110 may be configured to calculate one or more parameters of the image of the object. Examples of these parameters include directionality of the image, homogeneity of the image, regularity of the image and roughness of the image. The parameters are used to classify the surface into a texture type from an available set of texture types.

In one embodiment, there are four texture types. Each texture type includes several reference images and its corresponding texture information. As used herein, a reference image is a two dimensional representation of an example object and the texture information includes information regarding the texture of the example object. As described above, each reference texture has corresponding reference spectral signatures.

The processor 110 may also be configured to generate spectral signatures from the image. In general, spectral signatures are the specific combination of reflected and absorbed electromagnetic (EM) radiation at varying wavelengths which can uniquely identify an object. For example, the spectral signature of stars indicates the spectrum according to the EM spectrum. The spectral signature of an object is a function of the incidental EM wavelength and material interaction with that section of the electromagnetic spectrum. Typically, measurements may be made with various instruments, including a task specific spectrometer. As used herein, a spectral signature corresponds to texture signatures extracted from the frequency spectrum of the image of the object. By analyzing the spectral signatures and comparing the spectral signatures of the image with the reference spectral signatures stored in the memory, the texture of the surface of the object 150 may be determined. The manner in which the texture of the object 150 is determined in described in further detail below.

The texture description and retrieval methods and system described herein may be used both in texture information based indexing and retrieval of one or more images. In one embodiment, textile texture images may be stored in a database, the corresponding data texture descriptors may also be generated and stored in the database. When a query textile texture image is entered into such a database, one or more query data texture descriptors associated with the query textile texture image may be generated and compared with the data texture descriptors stored in the database in order to perform retrieval of a matching textile image. Such matching may be based on determining the data texture descriptors in the database that are closest or most similar to the query data texture descriptors.

Figure 7:
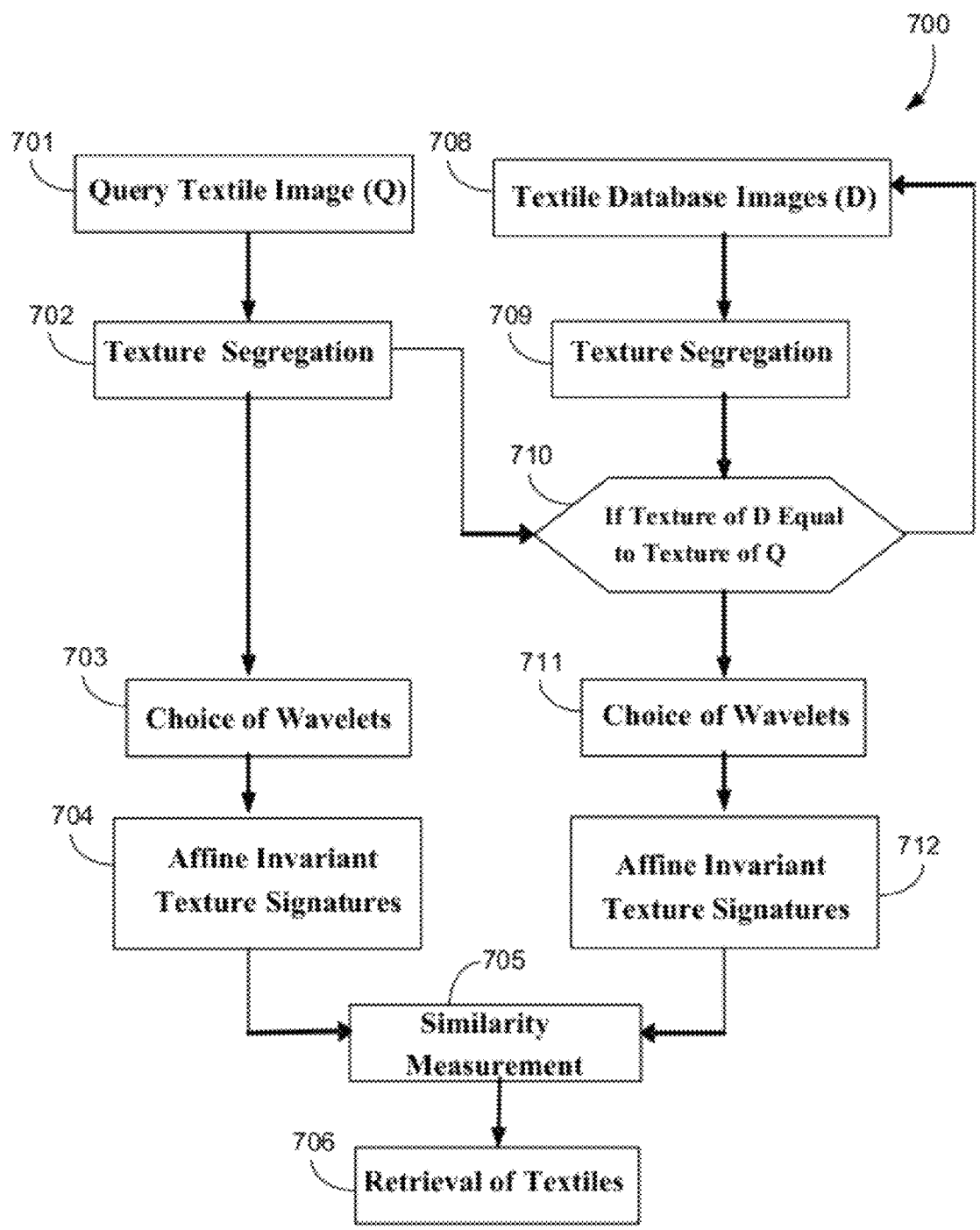
FIG. 7 is an illustrative embodiment of a method for textile retrieval.

FIG. 7 illustrates a non-limiting example method 700 for implementing a textile retrieval system according to an embodiment of the present disclosure. At block 701, a query textile texture image may be entered into a textile retrieval system. The type of texture may be segregated at block 702. In one embodiment, when the query textile texture is entered into the retrieval system, several texture features, such as directionality, homogeneity, regularity and roughness, may be extracted or determined. At block 702, the entered query textile texture image may be segregated into any one of these texture feature categories or types. Note that for textile texture images stored in such a textile retrieval system at block 708, similar actions may be performed at block 709.

The type of query textile texture image may be compared to those contained in a database of the textile retrieval system. At block 710, the query textile texture image and/or it associated query data texture descriptors may be compared to the textile texture images and/or data texture descriptors in the database. Note that the texture segregation process may be on-demand, and thus performed at block 709 for textile texture images stored in such a textile retrieval system as needed, for example when a query is entered.

At block 711, upon finding a matching textile texture image and/or data texture descriptors in the database, one or more wavelets may be chosen for the matching textile texture images. Likewise, at block 703, wavelets may be chosen for the query textile texture image. At blocks 704 and 712, affine invariant texture signatures may be extracted from the query textile texture image and the matching textile texture image, respectively. Similarity measurement may be performed comparing the query textile texture image and the matching textile texture image at block 705. At block 706, the relevant matching textiles are retrieved.

Figure 8:
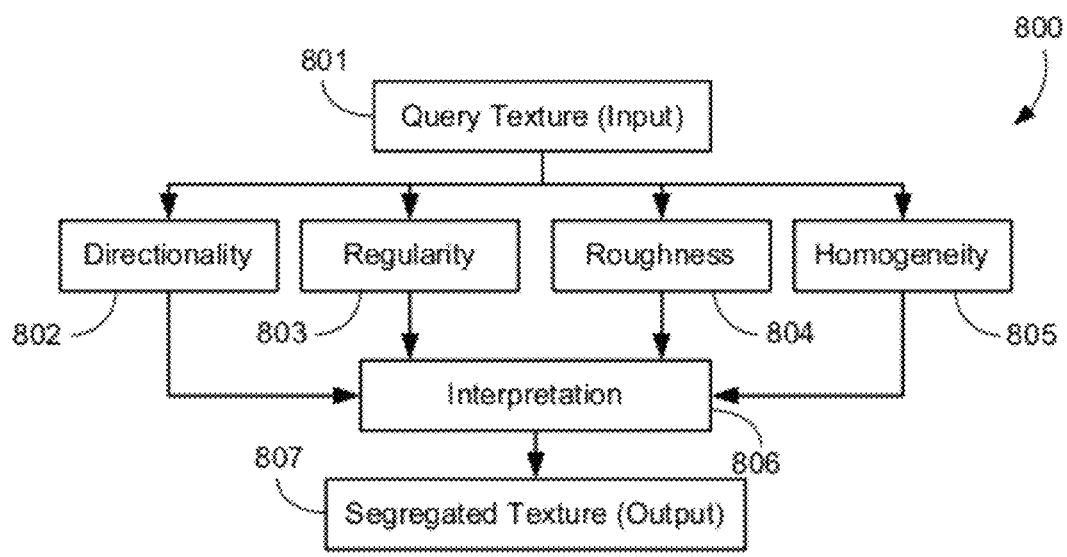
FIG. 8 is an illustrative embodiment of a method for textile segregation.

FIG. 8 illustrates a non-limiting example method 800 for performing texture segregation, for example, at blocks 702 and 709 of FIG. 7. At block 801, a textile texture image may be provide or received as input. At block 802 (which, in one embodiment, may be performed in parallel with the activities performed at block 803, 804, and/or 805), the directionality of the textile texture image may be determined. Directionality is a significant texture feature and may be well-perceived by a human visual system. In one embodiment, the geometric property of the directional histogram may be used to calculate the directionality of an image. To calculate the directionality histogram, which may be denoted as HD, the gray scale image may be convoluted with any horizontal and vertical edge operators. For a particular pixel of an image, the outputs of the horizontal and vertical operations may be identified as $\nabla H$ and $\nabla V$, respectively. Then a gradient vector for the pixel may be calculated with following formulae:

$$\text{Magnitude of vector: } |\nabla G| = \frac{|\nabla H| + |\nabla V|}{2}$$

$$\text{Angle of vector: } \theta = \tan^{-1}\left(\frac{\nabla V}{\nabla H}\right)$$

HD may then be calculated by quantizing $\theta$ and counting the number of pixels with a magnitude greater than a threshold. Next, all peaks and valleys in HD may be identified. In one embodiment, if there are np peaks in the histogram, for each peak p, let wp be the set of bins from its previous valley to its next valley, and let $\phi p$ be the angular position of the peak. wp may be considered as a hill whose peak is p. In such an embodiment, let HD($\phi$) be the height of a bin at angular position $\phi$.

Figure 9:
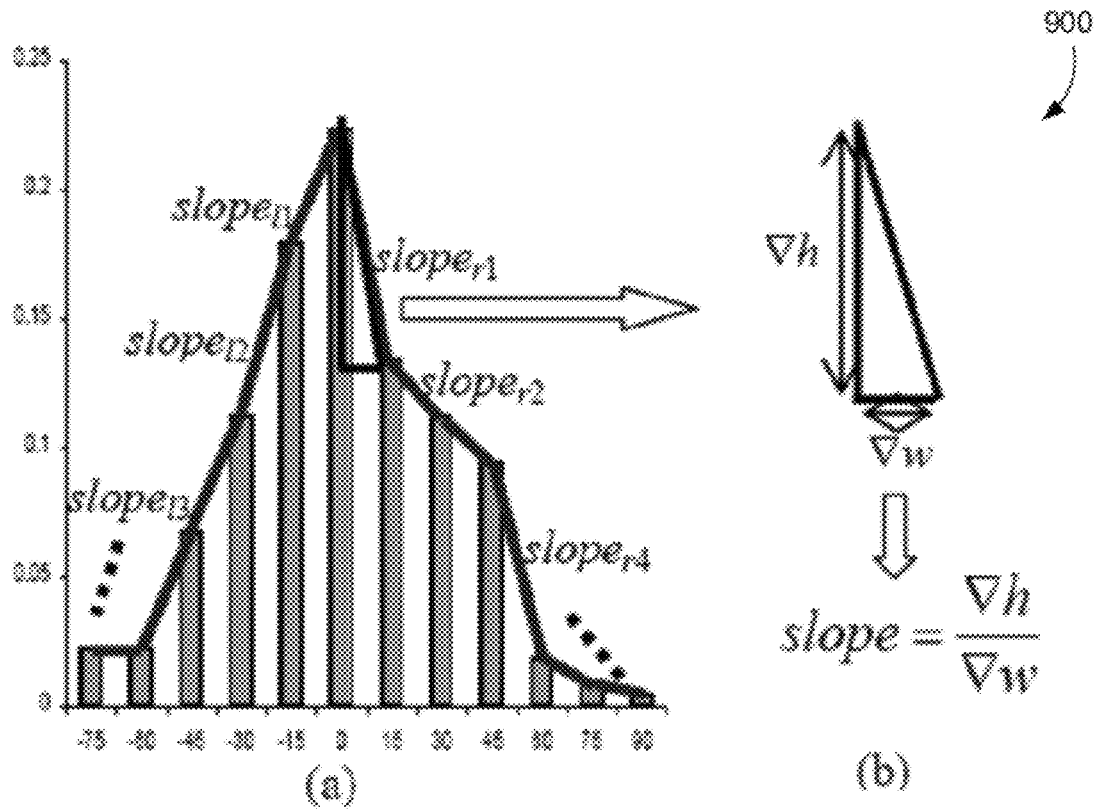
FIG. 9 is an illustrative directional histogram.

In the normalized directional histogram the angles may be represented in the horizontal axis. The angles in the range of $-90°$ to $+90°$ may be divided into 12 intervals and the quantized angles may be $-75°, -60°, -45°, \ldots, +90°$. The vertical axis may represent the percentage of pixels with different gradient angles. The edges oriented at $-90°$ are the same as edges oriented $+90°$. If the angles are placed in a circle as depicted in histogram 900 shown in FIG. 9, the next angle of $-75°$ in anti-clockwise direction may be $+90°$. Thus the histogram may be constructed starting from any angle. By considering the circular nature of bins, the position effect may be removed.

Further at block 802, the sharpness of each hill in the histogram may be calculated from geometric slope of each hill. The sharpness of the hill may be then calculated as the weighted sum of slopes of all line segments joining bin tops using the following:

$$\text{Sharpness of hill} = \Sigma_i \text{weight}_{li} \times \text{slope}_{li} + \Sigma_i \text{weight}_{ri} \times \text{slope}_{ri}$$

where the weight of the slope may be obtained from:

$$\text{weight}_{lk} = 2^{-i+1},$$

$$\text{where } i = \frac{\text{circular Difference}(peakpos, bin_k pos)}{\text{minicircular difference between two bin positions}}.$$

Then, the directionality of the textile texture image may be determined using:

$$\text{directionality} = \sum_{\text{for each hill},h} \text{weight}_h \times \text{sharpness}_h$$

where:

$$\text{weight}_i = \frac{\text{bin Height}(peak_i)}{\sum_{\text{for each hill},h} \text{bin Height}(peak_h)}.$$

At block 805 of FIG. 8, (which, in one embodiment, may be performed in parallel with the activities performed at block 802, 803, and/or 804), the homogeneity of the textile texture image may be determined. Homogeneity is one of the Haralick features obtained based on cooccurence matrices of greyscale images. The Grey Level Cooccurence Matrix (GLCM) may be constructed from the textile texture image by estimating the pairwise statistics of pixel intensity. Each element (i,j) of such a matrix may represent an estimate of the probability that two pixels with a specified separation have grey levels i and j. The separation may be specified by a displacement, d and an angle, $\theta$:

$$\text{GLCM},\phi(d,\theta) = [\hat{f}(i,i|d,\theta)]$$

where $\phi(d, \theta)$ may be a square matrix of side equal to the number of grey levels in the image and may not be symmetric. Symmetry may be introduced by effectively adding the GLCM to it's transpose and dividing every element by 2. This may render $\phi(d, \theta)$ and $\phi(d, \theta+180°)$ identical and makes the GLCM unable to detect 180° rotations. Thus, homogeneity may be given by:

$$H = \sum_{i,j} \frac{1}{1+(i-j)^2} \hat{f}(i,j)$$

For any choice of d and $\theta$, a separate GLCM may be obtained that may be sensitive to the value of d and $\theta$. The GLCM may be implemented with some degree of rotation invariance. This may be achieved by combining the results of a subset of angles. If the GLCM is calculated with symmetry, then only angles up to 180° then need to be considered and the four angles (0°, 45°, 90°, 135°) may be effective choices. The results may be combined by averaging the GLCM for each angle before calculating the features or by averaging the features calculated for each GLCM.

At block 803 of FIG. 8, (which, in one embodiment, may be performed in parallel with the activities performed at block 802, 804, and/or 805), the regularity of the textile texture image may be determined. Regularity may be obtained from the projection function. Let F(u,v) be the Fourier version of original image f(x,y), and let F($\rho,\theta$) be the wavelet transform of the projection of f(x,y) onto a line at an angle $\theta$. Conversion in polar form may be performed as follows:

$$\rho = \sqrt{(u^2+v^2)}$$

$$\theta = \tan^{-1}(v/u)$$

here $\rho, \theta, u, v$ represent the location.

Because the frequency distribution (spectrum magnitude as the probability of the corresponding frequency) may provide a description of texture periodicity, we may calculate the central moment as follows:

$$C(\theta) = \sum_\rho (\rho - \bar{\rho}) W(\rho, \theta)$$

where $\bar{\rho}$ may be the mean value of $\rho$. $C(\theta)$ may measure the periodicity of texture regularity. The power spectrum may provide a measurement of the amplitude of texture regularity, and may therefore be used to calculate the regularity of texture.

At block 804 of FIG. 8, (which, in one embodiment, may be performed in parallel with the activities performed at block 802, 803, and/or 805), the roughness of the textile texture image may be determined. The roughness of the texture can be calculated from the root mean square as:

$$s_q = \sqrt{\frac{1}{MN} \sum_{K=0}^{M-1} \sum_{L=0}^{N-1} [z(x_k, y_k) - \mu]^2}$$

where $\mu$ may be the mean value of the height, across all in-plane coordinates of image. $\mu$ may be obtained using:

$$\mu = \frac{1}{MN} \sum_{K=0}^{M-1} \sum_{L=0}^{N-1} Z(X_k, Y_k)$$

Note that this method of determining roughness may have a limitation in that roughness may be computed indiscriminately towards the polarity of the height value at a given pixel, relative to the mean height value across all the pixels in the image. The result may be that the roughness may measure nearly the same for two different surfaces, for example, a flat surface with many holes and a flat surface with many peaks. To distinguish different kind of surfaces, another parameter may be calculated to obtain the roughness of texture called the skewness parameter. Skewness $S_{sk}$ may be obtained by:

$$S_{sk} = \frac{1}{MNS_q^3} \sum_{i=0}^{M-1} \sum_{i=0}^{N-1} [z(x_k, y_k) - \mu]^3$$

This formula is similar to the root mean square formula, but unlike rms (roughness), skewness $S_{sk}$ may take on positive and negative values as well as zero (even if the surface is not perfectly smooth), because each term in the double summation is raised to an odd power. After calculation of the above mentioned features for a textile texture image, the results may be interpreted at block 806 of FIG. 8, and the textile texture image may be segregated into any one of the above mentioned categories at block 807.

Referring again to FIG. 7, and specifically to blocks 703 and 711, one or more wavelets may be chosen for a textile texture image. One wavelet that may be chosen is a Daubechies wavelet, which may be selected from the Daubechies wavelet that are a family of orthogonal wavelets defining a discrete wavelet transform and characterized by a maximal number of vanishing moments for some given support. With each wavelet type in this family of wavelets, there may be a scaling function (also called father wavelet) that generates an orthogonal multi-resolution analysis. The wavelet coefficients may be derived by reversing the order of the scaling function coefficients and then reversing the sign of every second scaling function coefficients. These wavelets have no explicit expression except for dbl, which is the Haar wavelet.

Another wavelet that may be chosen is a Mexican Hat wavelet. A Mexican Hat wavelet may be defined as the second derivative of a Gaussian probability distribution function. This transform may be used to obtain a good retrieval rate for isotropic textures. The scaling coefficients for the Mexican Hat wavelet transform may be obtained as follows:

$$S(x) = c^* e^{(-x^2/2)} (1-x^2)$$

where the constant c is:

$$c = \frac{2}{\prod^{1/4} \sqrt{3}}$$

The wavelet coefficients may be derived by reversing the order of the scaling function coefficients and then reversing the sign of every second scaling function coefficients.

Another wavelet that may be used is a Gabor wavelet. A Gabor filter is a linear filter whose impulse response i may be defined by a harmonic function multiplied by a Gaussian function. A Gabor wavelet, with width parameter w and frequency parameter v, may be represented as the following analyzing wavelet:

$$\Psi(X) = W^{-1/2} e^{-\pi(X/W)^2} e^{i2\pi VX/W},$$

The wavelet is complex valued. Its real part may be:

$$\Psi_R(X) = W^{-1/2} e^{-\pi(X/W)^2} \cos(2\pi VX/W)$$

and its imaginary part may be:

$$\Psi_I(X) = -^{1/2} e^{\pi(X/W)^2} \sin(2\pi VX/W)$$

The width parameter w may play the same role as it does for the Mexican hat wavelet. w may control the width of the region over which most of the energy of $\Psi(X)$ is concentrated. The frequency parameter v may provide the Gabor wavelet with an extra parameter for analysis.

Another wavelet that may be used, in one embodiment as an alternative to the Gabor wavelet, is the log-Gabor wavelet. Natural images may be better coded by filters that have Gaussian transfer functions when viewed on the logarithmic frequency scale. Gabor functions may have Gaussian transfer functions only when viewed on the linear frequency scale. On the linear frequency scale the log-Gabor function has a transfer function of the form:

$$G(W) = e^{(-\log(W/W_0)^2 / 2 \log(K/W_0)^2)}$$

where $w_o$ may be the filter's center frequency. To obtain constant shape ratio filters, the term $K/w_o$ may also be held constant for varying $w_o$. Each of the wavelets are described herein may be applied for different types of textures, and the best wavelet for a particular type of texture may be identified based on the retrieval of such a texture from a database as described.

Figure 2:
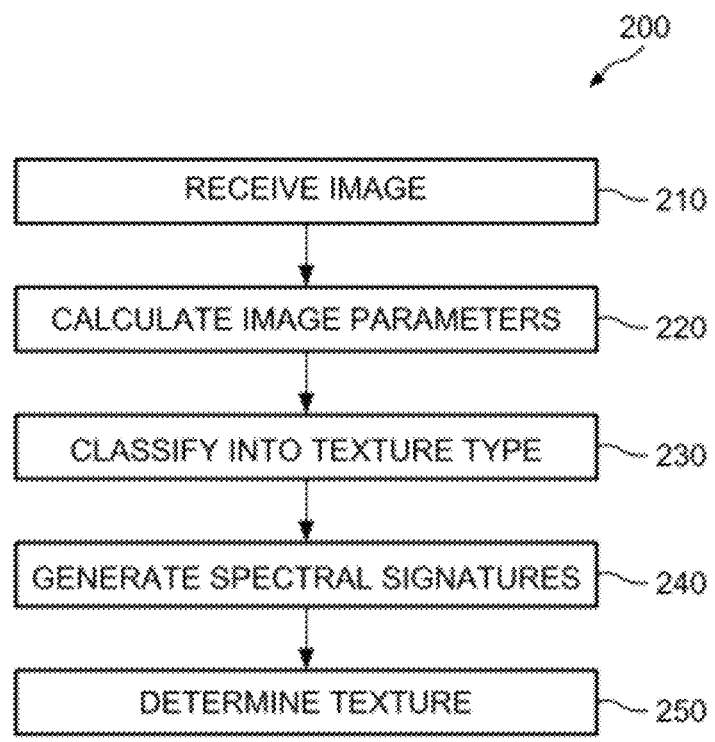
FIG. 2 is a flow chart of one of an illustrative embodiment of a method for determining a texture of an object.

FIG. 2 is a flow chart one of an alternative embodiment of a method 200 for determining a texture of an object. The method 200 in FIG. 2 may be implemented using, for example, the texture identification system 100 discussed above. The method 200 may include one or more operations, actions, or functions as illustrated by one or more of blocks 210, 220, 230, 240 and/or 250. Although illustrated as discrete blocks, various blocks may be divided into additional blocks, combined into fewer blocks, or eliminated, depending on the desired implementation. Processing may begin at block 210.

At block 210, a texture identification system may receive an image of an object whose texture is to be determined. Processing may continue from block 210 to block 220.

At block 220, the texture identification system may calculate various parameters of the image. The parameters are descriptors of the texture of the object. For example, a directionality parameter may be calculated to indicate the direction of the texture, for example, vertical, horizontal, diagonal, etc. A homogeneity parameter may be calculated to indicate if the texture of the object is the same throughout the surface. A regularity parameter may be calculated to indicate whether the texture of the object is regular (that is, to indicate the regularity of the texture). A roughness parameter may be calculated to indicate whether the texture is rough or smooth (that is, to indicate the roughness or smoothness of the texture).

Several techniques may be employed to determine the various parameters of the image. For example, a directionality parameter of the image may be obtained by generating a directional histogram. The directional histogram of the image may be based on a gray scale value of each pixel in the image. The directionality parameter may be determined by calculating the number of peaks in the histogram. The directionality parameter provides an estimate of whether the texture of the object is aligned in a specific direction.

Similarly, a homogeneity parameter of the image may be obtained by generating a co-occurrence matrix of the image. A co-occurrence matrix is a representation of the occurrence of each pixel in the image with respect to its surrounding pixels. In one embodiment, a grey level co-occurrence matrix (GLCM) is constructed from the image by estimating the pair wise statistics of pixel intensity. The co-occurrence matrix provides an estimate of whether the surface of the object is homogeneous.

A regularity parameter of the image may be obtained by first representing the image in a frequency domain and then analyzing the frequency spectrum of the image. The frequency spectrum is analyzed using mathematical models to determine texture periodicity which in turn reflects the regularity of the surface of the object.

Similarly, a roughness parameter of the image may be determined by calculating a root mean scare value for the image. The root mean square value is a sum of the variation of each pixel value (intensity value) with reference to a mean pixel value. The root mean square value provides an estimate of the roughness of the surface of the object. Note that any of these parameters may be calculated as described above, or alternate means or methods may be used to determine such parameters. All such embodiments are contemplated as within the scope of the present disclosure.

Processing may continue from block 220 to block 230 where the surface may be classified, or segregated, into at least one texture type from a set of available texture types. In a specific embodiment, the surface may be classified into a single texture type. Examples of available texture types include homogenous textures, directional textures, regular textures and rough textures. The texture type is based on several parameters. Further, each texture type includes several reference images. Processing may continue from block 230 to block 240.

At block 240, a frequency spectrum of the image may be generated. In one embodiment, to generate a frequency spectrum, the image may first be converted into a frequency domain using a transform function. In one embodiment, the transform function may be selected based on the texture type of the image. Examples of transform functions include Fourier transforms and wavelet transforms. In one embodiment, a 3D Fourier transform is used. Examples of wavelet transforms include Daubechies wavelets, Mexican Hat wavelets, Gabor wavelets and Log Gabor wavelets, as described herein. Any other wavelets may be used, and all such wavelets are contemplated as within the scope of the present disclosure. Processing may continue from block 240 to block 250.

At block 250, the texture of the surface may be determined by extracting the spectral signatures from the frequency spectrum. A texture value may be computed from the spectral signatures. The texture value may be computed by comparing the spectral signatures with the reference spectral signatures. Each comparison generates a corresponding texture value.

In one embodiment, the texture may be determined based on comparison that generates the minimum texture value.

The spectral signatures generated are based on a specific characteristic of the image. When the image appears to be rotated, a spectral signature for a rotation parameter is generated. Similarly, when the image is scaled, spectral signatures for a scaling parameter and a translation parameter are generated. The manner in which a spectral signature for a rotation parameter is computed is described in further detail below.

Figure 3:
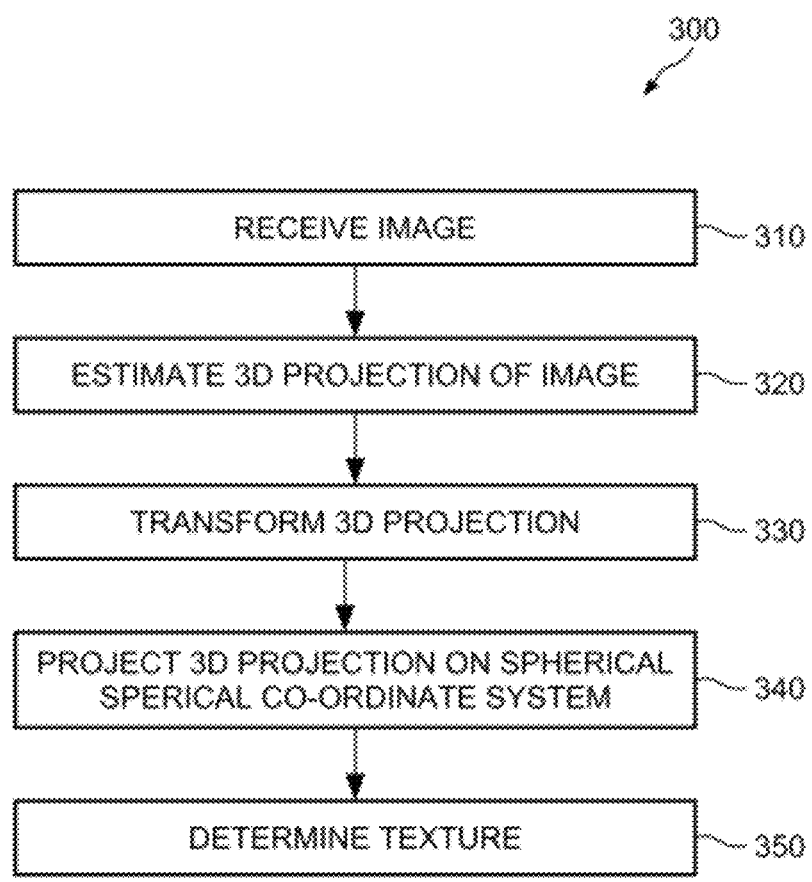
FIG. 3 is a flow chart of one illustrative embodiment of a method for determining a texture of the object from frequency spectrums.

FIG. 3 is a flow chart of an illustrative embodiment of a method 300 for determining a texture of the object from frequency spectrums. As one part of this method, as mentioned above, the texture may initially be projected into a 3D Cartesian co-ordinate system. The method 300 in FIG. 3 may be implemented using, for example, the texture identification systems and methods discussed above. The method 300 may include one or more operations, actions, or functions as illustrated by one or more of blocks 310, 320, 330, 340 and/or 350. Although illustrated as discrete blocks, various blocks may be divided into additional blocks, combined into fewer blocks, or eliminated, depending on the desired implementation. Processing may begin at block 310.

At block 310, a two-dimensional image representative of a surface of an object is received. In one embodiment, the image is rotated. Processing may continue from block 310 to block 320.

At block 320, a three-dimensional (3D) projection of the image is estimated. In one embodiment, the projection is estimated using an intensity value, a tilt angle and an orientation angle.

In one embodiment, the 3D projection is obtained by projecting the two dimensional image onto a Cartesian coordinate system. For example, consider an image represented generally as I(x, y) with a total number of 'M' pixels, a tilt angle represented by 'a' and an orientation angle 'β'. When the image is projected on to a Cartesian plane of f(x, y, z), it may be represented as:

$$x = M \sin \beta \cos \alpha \qquad \text{Equation (1)}$$

$$y = M \sin \beta \sin \alpha \qquad \text{Equation (2)}$$

$$z = M \cos \beta \qquad \text{Equation (3)}$$

Processing may continue from block 320 to block 330 where the 3D projection is transformed into a frequency domain. In one embodiment, a 3D Fourier transform is used for the transformation. Thus for the image projection f(x, y, z) in the Cartesian co-ordinate system, the three dimensional Fourier transform F(u,v,w) is represented by:

$$F(u,v,w) = \iiint f(x,y,z) \exp(-j2\pi(ux+vy+wz)) dx\, dy\, dz \qquad \text{Equation (4)}$$

In one embodiment, $f_r(x_r, y_r, z_r)$ may be the rotated version of f(x, y, z). In such an embodiment, the relationship of these two images may be formulated as follows:

$$f_r(x_r, y_r, z_r) = f(x, y, z)$$

$$\begin{bmatrix} x_r \\ y_r \\ z_r \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} x \\ y \\ z \end{bmatrix}$$

where R is the orthogonal matrix. When the original texture is rotated by an angle, the frequency spectrum may also be rotated by the same, demonstrating the rotation property of the Fourier transform.

Processing may continue from block 330 to block 340 where the 3D projection in the frequency domain is projected on to a spherical co-ordinate system. In general, the spherical coordinates of a point 'P' are defined by 'ρ', 'θ' and 'Ψ'. In general, 'ρ' represents the radius or radial distance from the origin 'O' to point 'P', the inclination (or polar angle), 'θ' is the angle between the zenith direction and the line segment connecting origin 'O' to point 'P' and 'Ψ' represents the azimuth angle measured from the azimuth reference direction to the orthogonal projection of the line segment OP on a reference plane.

Thus, F(u,v,w) may be projected on to a spherical coordinate system at angles 'θ' and 'Ψ'. The Fourier transform of such a projection may be F(ρ,θ,Ψ), where:

$$\rho = \sqrt{(u^2 + v^2 + w^2)} \quad \text{Equation (5)}$$

$$\Psi = \tan^{-1}(v/u) \quad \text{Equation (6)}$$

$$\theta = \cos^{-1}(w\sqrt{(u^2 + v^2 + w^2)}) \quad \text{Equation (7)}$$

and $F_r(\rho_r, \theta_r, \Psi_r)$ may be the Fourier transform of $f_r(x_r, y_r, z_r)$ projected onto a plane at angles $\theta_r$ and $\Psi_r$. The relationship between the rotated and unrotated image in spherical form may be represented as $F_r(\rho_r, \theta_r, \Psi_r) = F(\rho, \theta, \Psi)$.

Processing may continue from block 340 to block 350 where the texture of the surface is determined. In one implementation, the texture of the surface may be determined by analyzing spectral signatures extracted from the 3D projection on the spherical co-ordinate system. The frequency spectrums are generated for the tilt angle variation, the orientation angle variation, and the spectral signatures may be extracted. Since the frequency distribution (spectrum magnitude as the probability of the corresponding frequency) may provide a description of texture periodicity, the central moment of $F_r(\rho_r, \theta_r, \Psi_r)$ and $F(\rho, \theta, \Psi)$ may be calculated both for θ and Ψ using the following equations:

$$C_r(\theta) = \sum_{\rho_r} (\rho_r - \overline{\rho_r}) F(\rho_r, \theta_r, \Phi_r) \quad \text{Equation (8)}$$

$$C(\theta) = \sum_{\rho} (\rho - \overline{\rho}) F(\rho, \theta, \Phi) \quad \text{Equation (9)}$$

$$C_r(\Phi) = \sum_{\rho_r} (\rho_r - \overline{\rho_r}) F(\rho_r, \theta_r, \Phi_r) \quad \text{Equation (10)}$$

$$C(\Phi) = \sum_{\rho} (\rho - \overline{\rho}) F(\rho, \theta, \Phi) \quad \text{Equation (11)}$$

where '$\overline{\rho}$', and $\overline{\rho_r}$ may be the mean values of ρ and $\rho_r$. Equations 8-11 may be used to measure of a periodicity of the texture using $C(\theta)$, $C_r(\theta)$, $C(\Psi)$, and $C_r(\Psi)$.

The power spectrum may provide a measurement of the amplitude of texture regularity. Thus, it may be used to compute the spectral signatures at angles θ and $\theta_r = \theta + \Delta\theta$ as follows:

$$T_r(\theta) = C_r(\theta_r) \sum_{\rho_r} F_r(\rho_r, \theta_r, \Phi_r) \quad \text{Equation (12)}$$

$$T(\theta) = C(\theta) \sum_{\rho} F(\rho, \theta, \Phi) \quad \text{Equation (13)}$$

$$T_r(\Phi) = C_r(\Phi_r) \sum_{\rho_r} F_r(\rho_r, \theta_r, \Phi_r) \quad \text{Equation (14)}$$

$$T(\Phi) = C(\Phi) \sum_{\rho} F(\rho, \theta, \Phi) \quad \text{Equation (15)}$$

such that the orientation spectral Signatures T(θ), $T_r(\theta)$, T(Ψ) and $T_r(\Psi)$ are obtained. The texture signature may be rotation dependent and it may be a periodic function of θ and Ψ with a period of 2Π.

If T(θ) and T(Ψ) are computed from f(x, y, z) and $T_r(\theta)$ and $T_r(\Psi)$ are computed from $f_r(x_r, y_r, z_r)$ rotated by Δθ and ΔΨ from f(x, y, z), T(θ) may be equal to $T_r(\theta)$ if $\theta_r = \theta + \Delta\theta$. Similarly T(Ψ) may be equal to $T_r(\Psi)$ $\Psi_r = \Psi + \Delta\Psi$. Thus a rotation of the input image f(x, y, z) by Δθ and ΔΨ may be equivalent to a translation of its spectral signatures by the same amount along the orientations. Since the Fourier magnitude is invariant to translation, the Fourier expansion of T(θ) and T(Ψ) may provide a set of rotation invariant features for the input image I(x, y).

Figure 4:
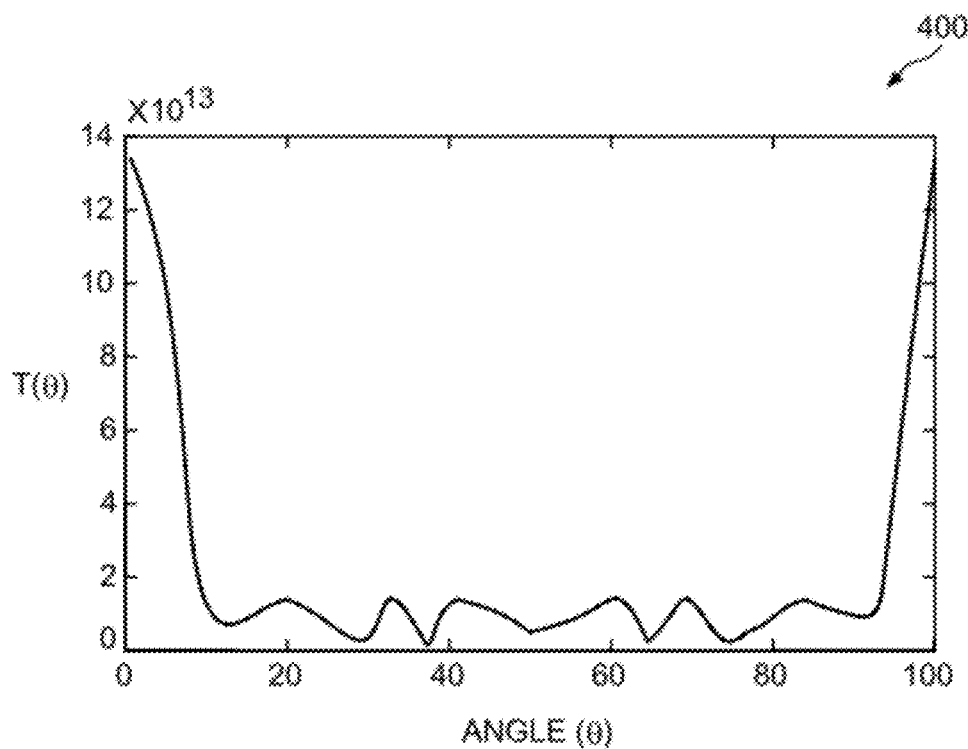
FIG. 4 shows an example graph depicting a frequency spectrum representative of a tilt angle variation.

FIG. 4 shows an example graph 400 depicting a frequency spectrum representative of a tilt angle variation. The graph 400 shows the distribution of the tilt angle variation for an example two-dimensional image. The x-axis represents a tilt angle 'θ' and the y-axis represents T(θ). As discussed above, T(θ) is a representative of a tilt angle variation. In one embodiment, T(θ) is obtained using equation (13).

Figure 5:
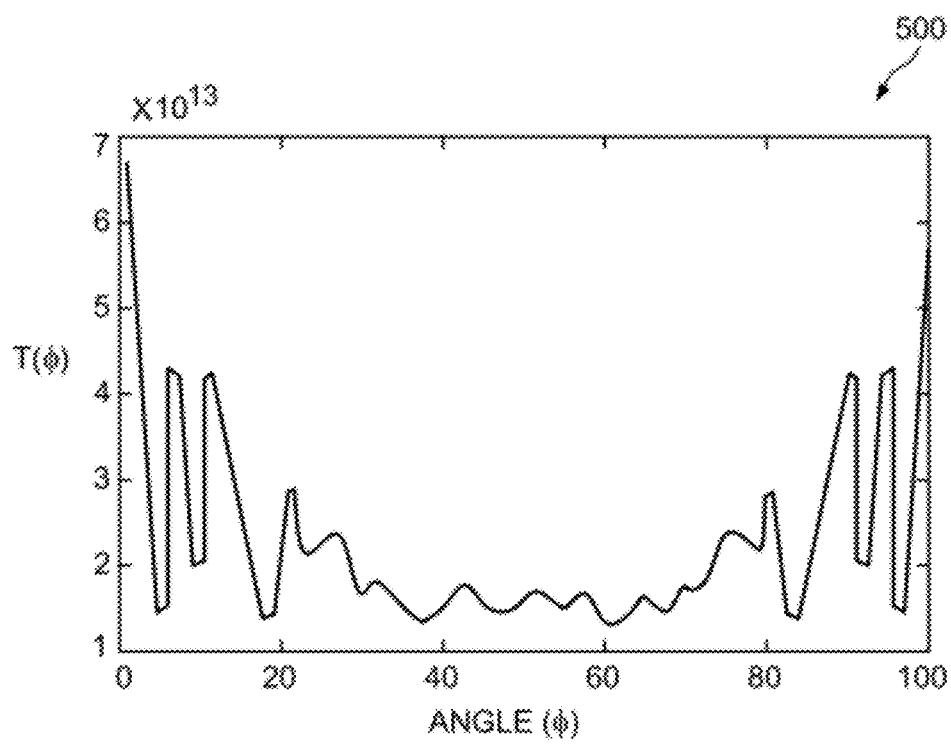
FIG. 5 shows an example graph depicting a frequency spectrum representative of an orientation angle variation.

FIG. 5 shows an example graph 500 depicting a frequency spectrum representative of an orientation angle variation. Graph 500 shows the distribution of the orientation angle variation for the example two-dimensional image whose frequency spectrum representative of the tilt angle variation is shown in FIG. 4. The x-axis represents an orientation angle 'φ' and the y-axis represents T(φ). As discussed above, T(φ) is a representative of an orientation angle variation. In one embodiment, T(φ) is obtained using equation (15).

In order to determine the texture of the surface, both spectral signatures are compared with corresponding reference spectral signatures of the reference images stored in the memory. The reference spectral signatures can be generated using one or more of equations (1) to (15) as described in FIG. 3.

In one embodiment, the spectral signature for the tilt angle variation is compared with several reference spectral signatures for tilt angle variation. Similarly, the spectral signature for the orientation angle variation is compared with several reference spectral signatures for orientation angle variation.

In one embodiment, a tilt angle value is calculated based on a sum of peak to peak distance between the spectral signature for the tilt angle variation and the reference spectral signature for the tilt angle variation. Thus, a tilt angle value is generated for each comparison.

Similarly, an orientation angle value is calculated based on a sum of peak to peak distance between the spectral signature for the orientation angle variation and the reference spectral signature for the orientation angle variation. Thus, a slant angle value is calculated for each comparison.

A texture value based on the tilt angle value and the orientation angle value is then generated for each comparison. In one embodiment, the texture value is he sum of the tilt angle value and the orientation angle value. The texture of the object is determined based on the reference spectral signatures that produce the minimum texture value.

Referring again to FIG. 7, and specifically to blocks 704 and 712, affine invariant texture signatures may be extracted from the textile texture images according to the disclosed embodiments. A textile texture image, such as a query textile texture image, may be a scaled, translated, and rotated (image and surface) version of the a textile texture image found, for example, in a catalogue. To generate the system invariant to this kind of affine distortions, in one embodiment the platform may be changed to the wavelet domain. A two-dimensional (2D) wavelet may contribute information for a simple image rotation, scale, and translation, but to incorporate the surface rotation (tilt (theta) and orientation (phi) changes), a three-dimensional (3D) wavelet transform may be utilized.

Figure 10:
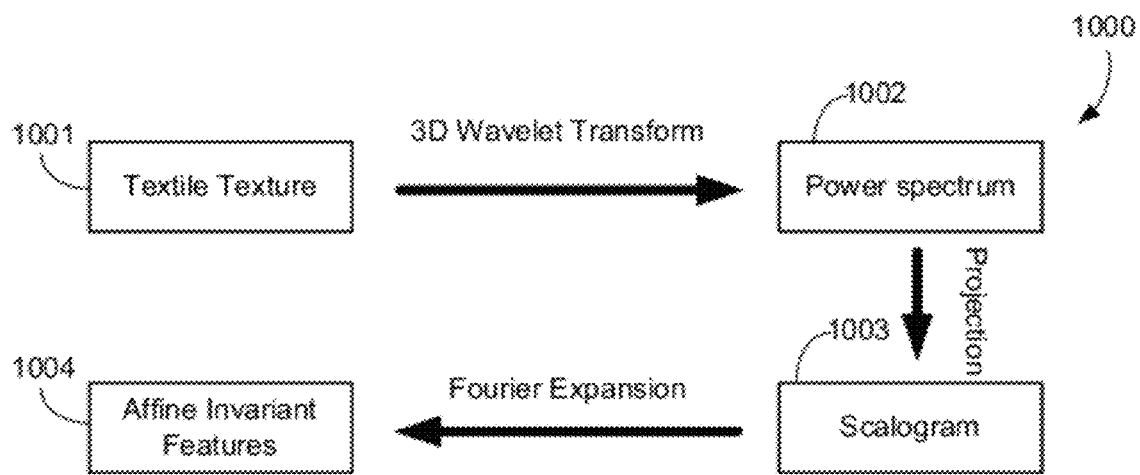
FIG. 10 is an illustrative embodiment of a method converting a wavelet transformed image to a spherical coordinate system.

FIG. 10 illustrates non-limiting example method 1000 for converting a wavelet transformed image to a spherical coordinate system so that the variations of tilt and orientation changes may be captured. At block 1001 a textile texture image may be provided or received. A 3D wavelet transform may be used to generate a power spectrum a block 1002. Projection may then be used to generate a scalogram at block 1003. Next, a Fourier transform may be used to determine affine invariant features at block 1004.

In an embodiment, $W(\rho, \theta, \phi)$ may be the wavelet transform of the projection of $f(x, y, z)$ onto a plane at angles $\theta$ and $\phi$, where:

$$\rho = \sqrt{(u^2 + v^2 + w^2)}$$

$$\Phi = \tan^{-1}(v/u)$$

$$\theta = \tan^{-1}\left(\frac{\sqrt{u^2 + v^2}}{w}\right)$$

and $W_a(x_a, y_a, z_a)$ may be the projection of $f_a(x_a, y_a, z_a)$ onto a plane at angles $\theta_a$ and $\phi_a$. The relationship between the original and affine distorted image in polar form may be represented as:

$$W_a(\rho_a, \theta_a, \Psi_a) = W(\rho, \theta, \Psi)$$

Since the frequency distribution (spectrum magnitude as the probability of the corresponding frequency) may provide a description of texture periodicity, the central moment may be calculated as follows:

$$C_a(\theta) = \sum_{\rho_a} (\rho_a, \overline{\rho}_a) W(P_a, \theta_a, \Phi_a)$$

$$C(\theta) = \sum_{\rho} (\rho - \overline{\rho}) W(\rho, \theta, \Phi)$$

$$C_a(\Phi) = \sum_{\rho_a} (\rho_a - \overline{\rho}_a) W(\rho_a, \theta_a, \Phi_a)$$

$$C(\Phi) = \sum_{\rho} (\rho - \overline{\rho}) W(\rho, \theta, \Phi)$$

where $\overline{\rho}$ and $\overline{\rho}_a$ are the mean value of $\rho$ and $\rho_a$. $C(\theta)$ may measure the periodicity of texture regularity, and $C_a(\theta)$, $C(\phi)$ and $C_a(\Psi)$ may be similarly calculated. Note that the power spectrum may provide a measurement of the amplitude of texture regularity. Thus, the power spectrum may be taken into account to compute the signatures at angle $\theta$ and $\theta_a = \theta + \Delta\theta$ as follows:

$$T_a(\theta) = C_a(\theta) \sum_{\rho_a} W_a(\rho_a, \theta_a, \Phi_a)$$

$$T(\theta) = C(\theta) \sum_{\rho} W(\rho, \theta, \Phi)$$

$$T_a(\Phi) = C_a(\Phi) \sum_{\rho_a} W_a(\rho_a, \theta_a, \Phi_a)$$

$$T(\Phi) = C(\Phi) \sum_{\rho} W(\rho, \theta, \Phi)$$

such that the orientation spectrum signatures $T(\theta)$, $T_a(\theta)$, $T(\Psi)$ and $T_a(\Psi)$ may be obtained.

The texture signature may be affine dependent and may be a periodic function of $\theta$ and $\phi$ with a period of $2\Pi$. If $T(\theta)$ and $T(\Psi)$ are computed from $f(x, y, z)$ and $T_a(\theta)$ and $T_a(\Psi)$ are computed from $f_a(x_a, y_a, z_a)$ affine distorted by $\Delta\theta$ and $\Delta\phi$ from $f(x, y, z)$, $T(\theta) = T_a(\theta)$ if $\theta_a = \theta + \Delta\theta$. Similarly results may be seen for $T(\Psi)$. Thus, a rotation of the input image $f(x, y, z)$ by $\Delta\theta$ and $\Delta\phi$ may be equivalent to a translation of its scalogram by the same amount along the orientations. The translation between the two plots may be evident; however the plots may share almost the same Fourier magnitude response. Since the Fourier magnitude is invariant to translation, the Fourier expansion of $T(\theta)$ and $T(\Psi)$ may provide a set of affine invariant features for the input image $I(x, y)$. Note that the above described techniques can be implemented in a computing device as is described below.

Figure 11:
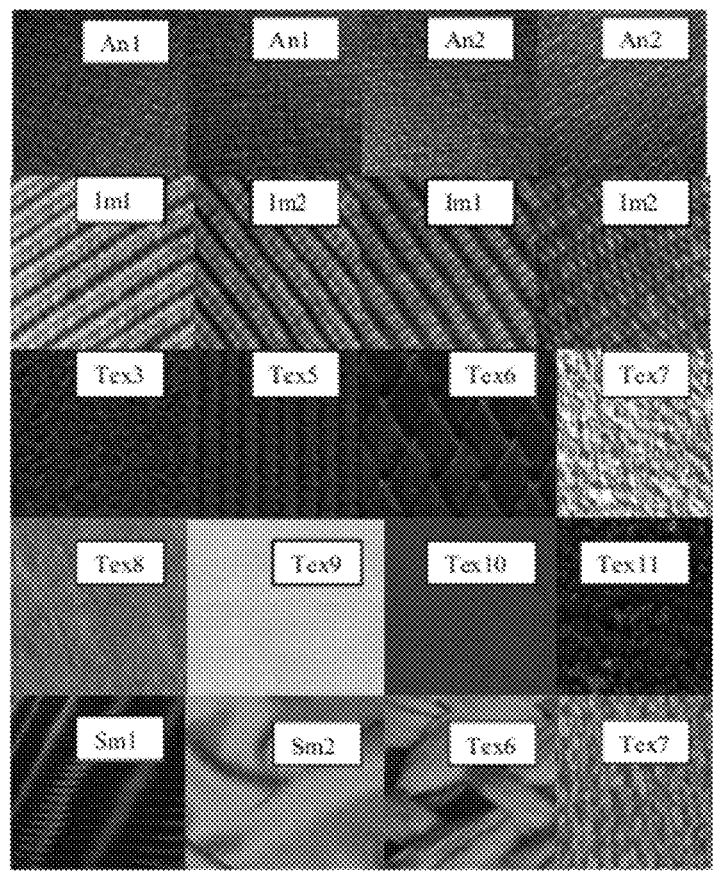
FIG. 11 is an illustrative example of images that may be contained in a textile texture database.

To demonstrate the effect of the embodiments described herein, example, non-limiting results of the various implementations of such embodiments will now be described. FIG. 11 illustrates examples of images that may be contained in a textile texture database. The images illustrated in FIG. 11 are merely examples and are not intended to limit the scope of the present disclosure in any way. In this example, images are captured and stored individually while surfaces are rotated and illuminated in varied conditions. The database as shown in FIG. 11 consists of four synthetic textures and thirty real textures. In terms of a rotation invariant texture classification scheme, this example texture database provides a set of surface rotations and image rotations along with the registered photometric stereo image data. Each texture sample has 40 samples under varying image rotations and surface rotations. Rotations are carried out by an increment of 30° and 45°. Also the database may contain scaled and translated version of the original texture.

Figure 12:
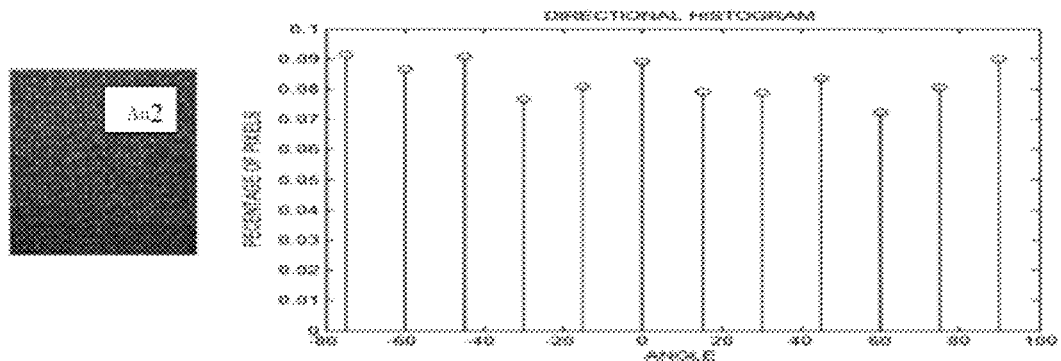
FIG. 12 is an illustrative directional histogram and corresponding textile texture image.

Directionality may be a significant texture feature that is well perceived by the human visual system. The geometric property of the directional histogram may be used to calculate the directionality of the image, as shown in FIG. 12, where a directional histogram is illustrated for image "An2" shown in FIG. 11. The directionality of the textile texture "An2" as shown in FIG. 12 is 46%. "An2" is an isotropic texture.

Figure 13:
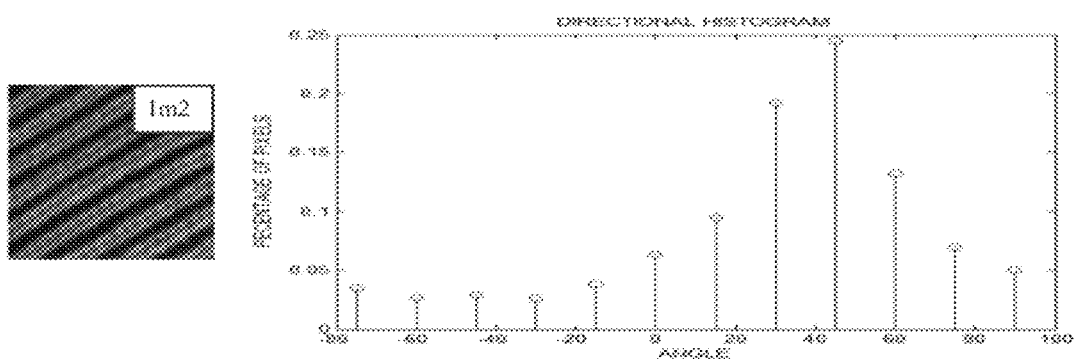
FIG. 13 is another illustrative directional histogram and corresponding textile texture image.

FIG. 13 illustrates a directional histogram for image "Im2" of FIG. 11. The directionality of this texture is 98%. The hill in the directional histogram may be referred to the set of bins from the previous valley to the next valley. The number of hills for the texture image "An2" seen in FIG. 12 is four, as can be seen in its directional histogram, whereas the texture image "Im2" has a single hill in its corresponding histogram as seen in FIG. 13. Thus it may be inferred that lesser the number of hills, the higher the directionality.

Figure 14:
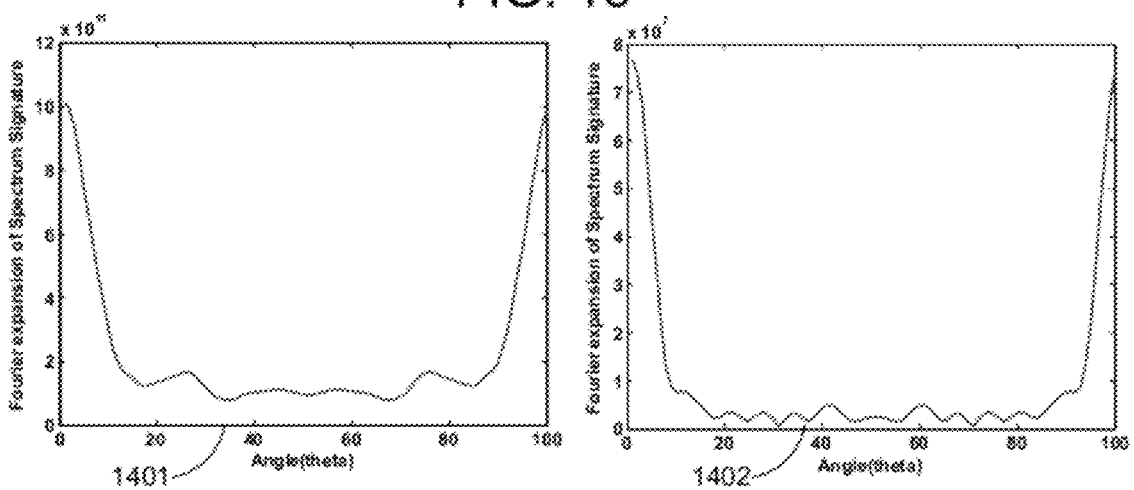
FIG. 14 is an illustrative spectral signature plot.

FIG. 14 illustrates a spectral signature plot that shows the results of using a Fourier transform of a scalogram signature by varying theta using a log Gabor wavelet. Chart 1401 illustrates the Fourier expansion of the spectrum signature of the original image as compared to angle theta, while chart 1402 illustrates the Fourier expansion of the spectrum signature of the affine distorted image as compared to angle theta.

Figure 15:
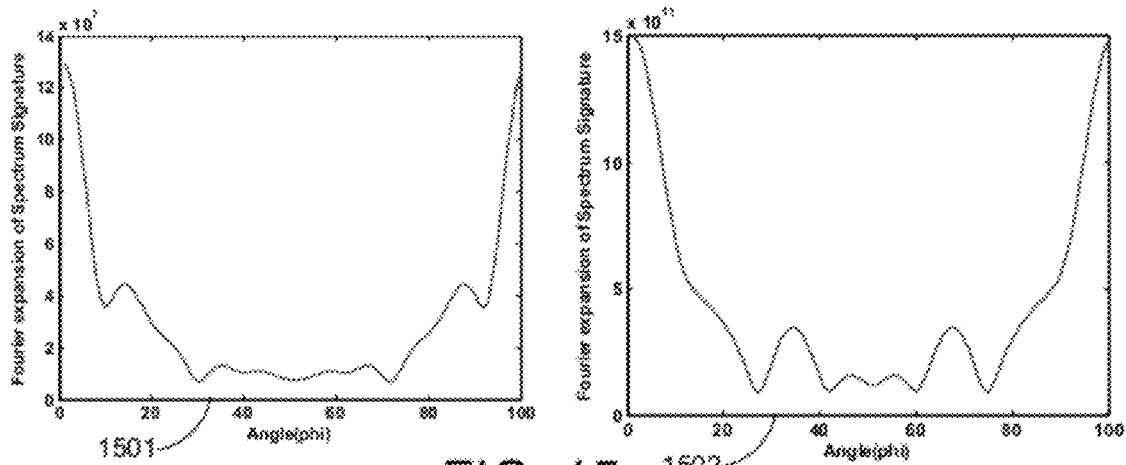
FIG. 15 is another illustrative spectral signature plot.

FIG. 15 illustrates a spectral signature plot that shows the results of using a Fourier transform of a scalogram signature by varying phi using a log Gabor wavelet. Chart 1501 illustrates the Fourier expansion of the spectrum signature of the original image as compared to angle phi, while chart 1502 illustrates the Fourier expansion of the spectrum signature of the affine distorted image as compared to angle phi.

Figure 16:
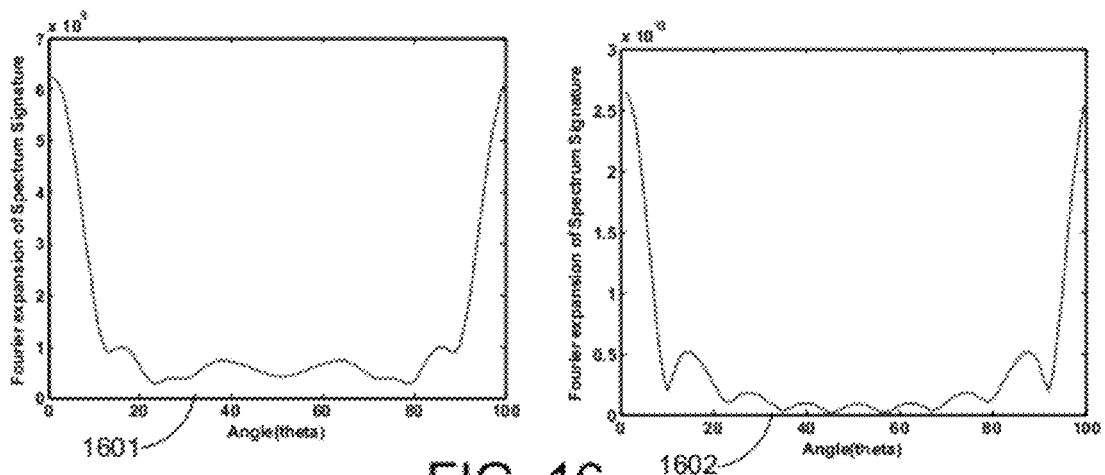
FIG. 16 is another illustrative spectral signature plot.

FIG. 16 illustrates a spectral signature plot that shows the results of using a Fourier transform of a scalogram signature by varying theta using a Daubechies wavelet. Chart 1601 illustrates the Fourier expansion of the spectrum signature of the original image as compared to angle theta, while chart 1602 illustrates the Fourier expansion of the spectrum signature of the affine distorted image as compared to angle theta.

Figure 17:
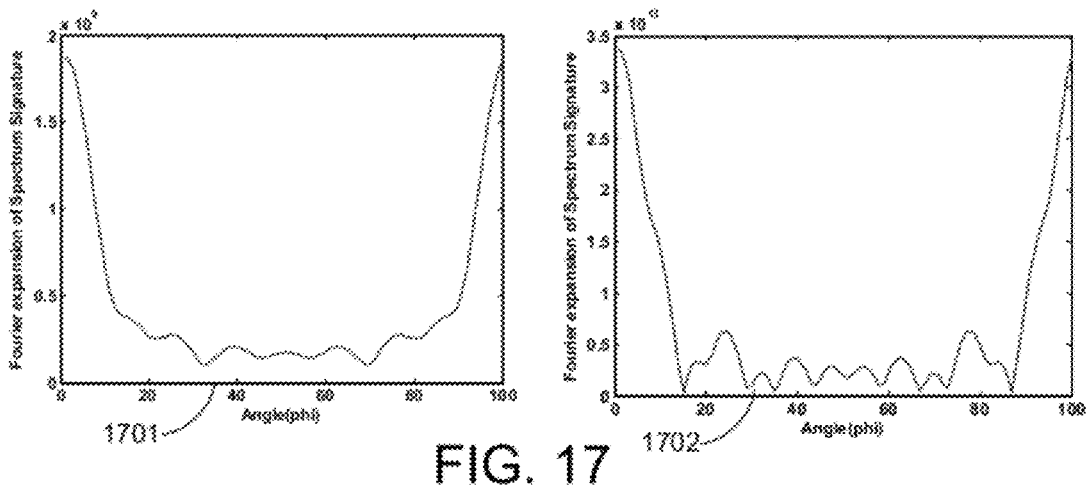
FIG. 17 is another illustrative spectral signature plot.

FIG. 17 a spectral signature plot that shows illustrates the results of using a Fourier transform of a scalogram signature by varying phi using a Daubechies wavelet. Chart 1701 illustrates the Fourier expansion of the spectrum signature of the original image as compared to angle phi, while chart 1702 illustrates the Fourier expansion of the spectrum signature of the affine distorted image as compared to angle phi.

From these results, it can be inferred that the Fourier expansion of a scalogram of an original and an affine distorted image remains similar, since the shift in peak is compensated by Fourier transform based on its affine invariant property. Based on the results obtained, it can further be inferred that log Gabor wavelets may provide a better retrieval result for directional type query image than other wavelet transforms. The values of all the performance evaluation measures for 20, 40, 60, 80 and 100 retrievals using a 3D log Gabor wavelet transform for directional texture are illustrated below in Table 1.

TABLE 1

Performance using 3D Log Gabor wavelet for Directional textile Texture

| | Retrievals | | | | |
|---|---|---|---|---|---|
| | 20 | 40 | 60 | 80 | 100 |
| Precision | 1 | 1 | 0.982 | 0.977 | 0.962 |
| Recall | 0.222 | 0.444 | 0.677 | 1 | 1 |
| Error rate | 0 | 0 | 0.018 | 0.023 | 0.038 |
| Retrieval Efficiency | 100 | 100 | 98.2 | 97.7 | 96.2 |

A Mexican hat wavelet may provide good retrieval results for Homogeneous type query image compared to other wavelet transforms. The values of all the performance evaluation measures for 20, 40, 60, 80 and 100 retrievals using a Mexican hat wavelet transform for directional texture are illustrated below in Table 2.

TABLE 2

Performance using 3DMexican hat wavelet for Homogeneous textile Texture

| | Retrievals | | | | |
|---|---|---|---|---|---|
| | 20 | 40 | 60 | 80 | 100 |
| Precision | 1 | 1 | 0.95 | 0.9 | 0.9 |
| Recall | 0.222 | 0.444 | 0.633 | 1 | 1 |
| Error rate | 0 | 0 | 0.05 | 0.1 | 0.1 |
| Retrieval Efficiency | 100 | 100 | 95 | 90 | 90 |

In Table 3, the results of a performance evaluation of various wavelet transforms are tabulated. It may be inferred from these results that the Mexican hat wavelet provides good retrieval efficiency for homogeneous textures. Similarly, log Gabor wavelets may provide good retrieval efficiency for directional and regular texture, while Daubechies and Gabor wavelets may work well for directional textures. Therefore, in some embodiments, the type of wavelet chosen may be based on the type of texture of the query image.

TABLE 3

Performance evaluation of various Wavelet transforms

| | Method | | | | |
|---|---|---|---|---|---|
| Measure | Daubecheis | Mexican Hat (Homogeneous) | Gabor | Log Gabor (regular) | Log Gabor (directional) |
| Precision | 0.962 | 0.95 | 0.955 | 0.923 | 0.962 |
| Recall | 0.62 | 0.6598 | 0.622 | 1 | 0.61 |
| Error rate | 0.375 | 0.05 | 0.045 | 0.077 | 0.038 |
| Retrieval Efficiency | 96.2 | 95 | 95.5 | 92.3 | 96.2 |
| Computational Time | 17 s | 17 s | 17 s | 17 s | 15 s |

Figure 6:
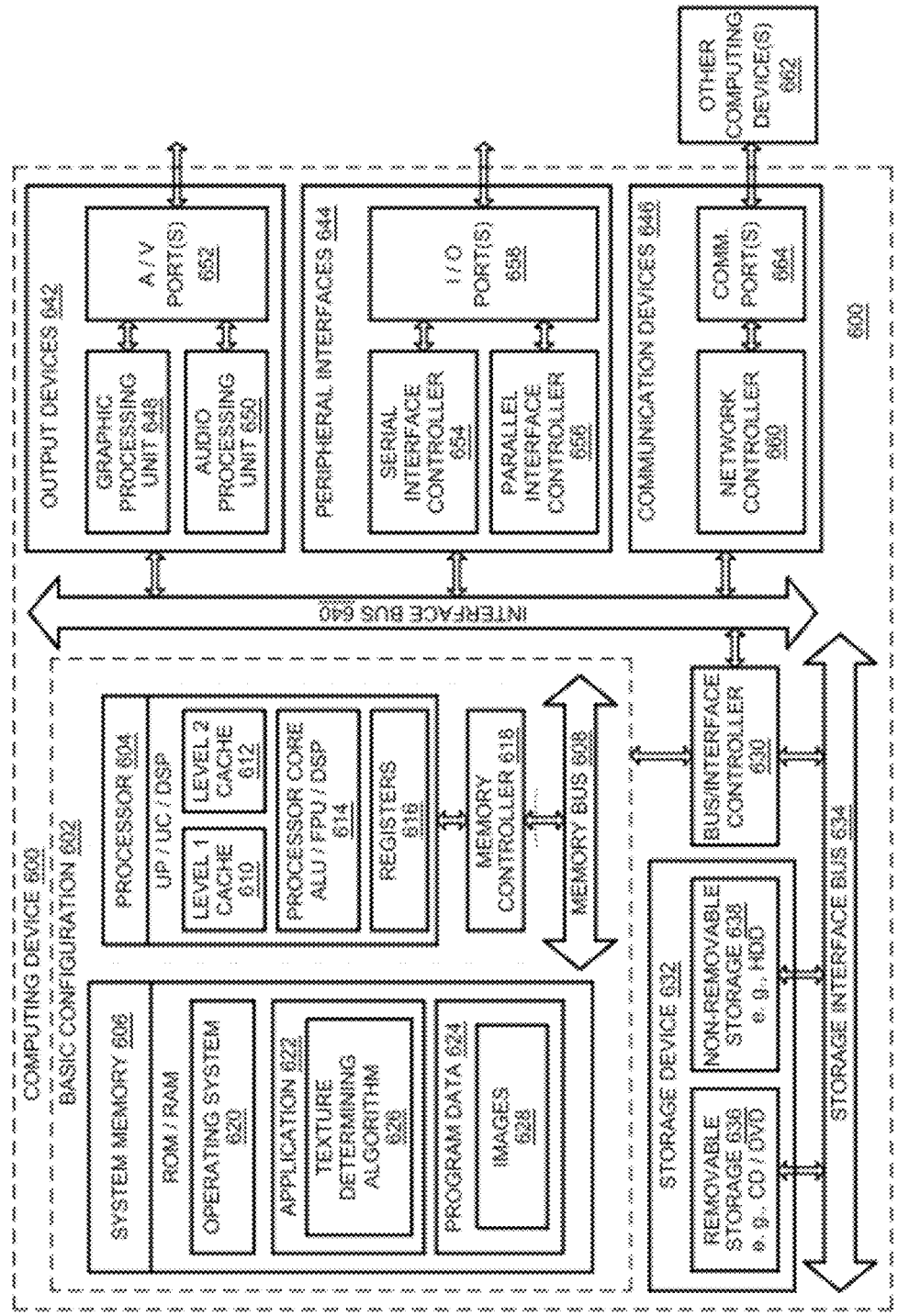
FIG. 6 is a block diagram of an illustrative embodiment of a computing device that may be arranged in accordance with the present disclosure.

FIG. 6 is a block diagram illustrating an example computing device 600 that may be arranged for determining a texture of an object in accordance with the present disclosure. In a very basic configuration 602, computing device 600 typically includes one or more processors and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a texture determining algorithm 626 that is arranged to generate a single fused image from a plurality of images. Program data 624 may include images 628 that are representative of reference objects which may be useful for various applications such as image processing as is described herein. In some embodiments, application 622 may be arranged to operate with program data 624 on operating system 620 such that the texture is determined from the image of the object. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method for determining a texture of an object, the method comprising:
   receiving a two-dimensional image representative of a surface of the object;
   estimating a three-dimensional (3D) projection of the image;
   transforming the 3D projection into a frequency domain;
   projecting the 3D projection in the frequency domain onto a spherical co-ordinate system;
   determining the texture of the surface by generating and analyzing spectral signatures for a tilt angle variation and an orientation angle variation extracted from the 3D projection on the spherical co-ordinate system;
   calculating a tilt angle value based on a comparison of sum of peak to peak distance between the spectral signature for the tilt angle variation and a reference spectral signature for the tilt angle variation;
   calculating an orientation angle value based on a comparison of sum of peak to peak distance between the spectral signature for the orientation angle variation and a reference orientation angle variation; and
   generating a texture value based on the tilt angle value and the orientation angle value.

2. The method of claim 1, wherein the transforming the 3D projection comprises using a 3D Fourier transform.

3. The method of claim 1, wherein the estimating the 3D projection comprises projecting the two dimensional image on to a Cartesian coordinate system.

4. The method of claim 1, further comprising classifying the surface into at least one texture type from among a plurality of texture types.

5. The method of claim 4, further comprising classifying the surface into the at least one texture type based on a plurality of parameters comprising at least one of homogeneity, directionality, regularity, or roughness.

6. The method of claim 1, wherein the texture value is the sum of the tilt angle value and the orientation angle value.

7. The method of claim 1, further comprising selecting a comparison that generates a minimum texture value.

8. A non-transitory computer program product, for use in a computing system including a processor and a memory, for implementing a method for performing texture identification of an object, the non-transitory computer program product comprising one or more physical computer readable medium having stored thereon computer-executable instructions that, when executed by the processor, causes the computing system to:
   access a two-dimensional image representative of a surface of the object;
   estimate a three-dimensional (3D) projection of the image;
   transform the 3D projection into a frequency domain;
   project the 3D projection in the frequency domain on to a spherical co-ordinate system;
   determine the texture of the surface by generating and analyzing spectral signatures for a tilt angle variation and an orientation angle variation extracted from the 3D projection on the spherical co-ordinate system;
   calculate a tilt angle value based on a comparison of sum of peak to peak distance between the spectral signature for the tilt angle variation and a reference spectral signature for tilt angle variation;
   calculate an orientation angle value based on a comparison of a sum of peak to peak distance between the spectral signature for the orientation angle variation and a reference orientation angle variation; and
   generate a texture value based on the tilt angle value and the orientation angle value.

9. The non-transitory computer program product of claim 8, wherein the estimation of the 3D projection is by projecting the two dimensional image on to a Cartesian coordinate system.

10. The non-transitory computer program product of claim 8, wherein the computer-executable instructions, when executed by the processor, further cause the computing system to classify the surface into at least one texture type from among a plurality of texture types.

11. The non-transitory computer program product of claim 10, wherein the computer-executable instructions, when executed by the processor, cause the computing system to classify the surface into the at least one texture type based on a plurality of parameters comprising at least one of homogeneity, directionality, regularity, or roughness.

12. The non-transitory computer program product of claim 8, wherein the computer-executable instructions, when executed by the processor, further cause the computing system to select a comparison that generates a minimum texture value.

13. The non-transitory computer program product of claim 8, wherein the texture value is the sum of the tilt angle value and the orientation angle value.

14. A system to determine a texture of an object, the system comprising:
   a memory configured to store a two-dimensional image representative of a surface of the object; and
   a processor configured to:
      access the two-dimensional image,
      estimate a three-dimensional (3D) projection of the image,
      transform the 3D projection into a frequency domain,
      project the 3D projection in the frequency domain on to a spherical co-ordinate system,
      determine the texture of the surface by generating and analyzing spectral signatures for a tilt angle variation and an orientation angle variation extracted from the 3D projection on the spherical co-ordinate system,
      calculate a tilt angle value based on a comparison of sum of peak to peak distance between the spectral signature for the tilt angle variation and a reference spectral signature for the tilt angle variation,
      calculate an orientation angle value based on a comparison of sum of peak to peak distance between the spectral signature for the orientation angle variation and a reference orientation angle variation, and
      generate a texture value based on the tilt angle value and the orientation angle value.

15. The system of claim 14, wherein the processor is configured to transform the 3D projection into the frequency domain using a 3D Fourier transform.

16. The system of claim 14, wherein the processor configured to estimate the 3D projection of the image comprises the processor configured to project the two dimensional image on to a Cartesian coordinate system.

17. The system of claim 14, wherein the processor is further configured to classify the surface into at least one texture type from among a plurality of texture types.

18. The system of claim 17, wherein the processor is configured to classify the surface into the at least one texture type based on a plurality of parameters comprising at least one of homogeneity, directionality, regularity, or roughness.

19. The system of claim 14, wherein the texture value is the sum of the tilt angle value and the orientation angle value.

20. The system of claim 14, wherein the processor is further configured to select a comparison that generates a minimum texture value.

\* \* \* \* \*

UNITED STATES PATENT AND TRADEMARK OFFICE
CERTIFICATE OF CORRECTION

PATENT NO.       : 8,699,785 B2
APPLICATION NO.  : 12/938193
DATED            : April 15, 2014
INVENTOR(S)      : Balakrishnan et al.

Page 1 of 3

It is certified that error appears in the above-identified patent and that said Letters Patent is hereby corrected as shown below:

On the title page, item (73), under "Assignee", in Column 1, Line 2, delete "Madurai, ID (US)" and insert -- Madurai (IN) --, therefor.

On the title page, in the Figure, for Tag "340", in Lines 1-2, delete "SPHERICAL SPERICAL CO-ORDINATE" and insert -- SPHERICAL CO-ORDINATE --, therefor.

In the Drawings

In Fig. 3, Sheet 2 of 9, for Tag "340", in Lines 1-2, delete "SPHERICAL SPERICAL CO-ORDINATE" and insert -- SPHERICAL CO-ORDINATE --, therefor.

In Fig. 6, Sheet 4 of 9, delete " " and insert -- --, therefor.

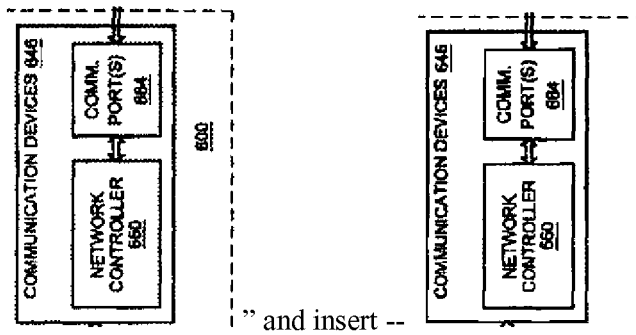

In the Specification

In Column 6, Line 17, delete "cooccurence" and insert -- cooccurrence --, therefor.

In Column 6, Line 18, delete "Cooccurence" and insert -- Cooccurrence --, therefor.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,699,785 B2

In Column 6, Line 30, delete "it's transpose" and insert -- its transpose --, therefor.

In Column 8, Line 34, delete "$\Psi_I(X) = ^{-1/2} e^{\pi(X/W)^2} \sin(2\pi VX/W)$," and insert -- $\Psi_I(X) = W^{-1}/2 e^{-\pi(X/W)^2} \sin(2\pi VX/W)$ --, therefor.

In Column 10, Line 48, delete "'a'" and insert -- 'α' --, therefor.

In Column 11, Line 16, delete "'Ψ'." and insert -- 'Φ'. --, therefor.

In Column 11, Line 20, delete "'Ψ'" and insert -- 'Φ' --, therefor.

In Column 11, Line 25, delete "'Ψ'." and insert -- 'Φ'. --, therefor.

In Column 11, Line 26, delete "F(ρ,θ,Ψ)," and insert -- F(ρ,θ,Φ), --, therefor.

In Column 11, Line 31, in Equation (6), delete "Ψ=tan$^{-1}$(v/u)" and insert -- Φ=tan$^{-1}$(v/u) --, therefor.

In Column 11, Line 35, delete "F$_r$(ρ$_r$,θ$_r$,Ψ$_r$)" and insert -- F$_r$(ρ$_r$,θ$_r$,Φ$_r$) --, therefor.

In Column 11, Line 36, delete "Ψ$_r$." and insert -- Φ$_r$. --, therefor.

In Column 11, Line 38, delete "F$_r$(ρ$_r$,θ$_r$,Ψ$_r$)=F(ρ,θ,Ψ)." and insert -- F$_r$(ρ$_r$,θ$_r$,Φ$_r$)=F(ρ,θ,Φ). --, therefor.

In Column 11, Line 49, delete "F$_r$(ρ$_r$,θ$_r$,Ψ$_r$) and F(ρ,θ,Ψ) may be calculated both for θ and Ψ" and insert -- F$_r$(ρ$_r$,θ$_r$,Φ$_r$) and F(ρ,θ,Φ) may be calculated both for θ and Φ --, therefor.

In Column 11, Line 67, delete "C(Ψ), and C$_r$(Ψ)." and insert -- C(Φ), and C$_r$(Φ). --, therefor.

In Column 12, Lines 19-20, delete "T(Ψ) and T$_r$(Ψ)" and insert -- T(Φ) and T$_r$(Φ) --, therefor.

In Column 12, Line 23, delete "T(Ψ)" and insert -- T(Φ) --, therefor.

In Column 12, Line 24, delete "T$_r$(Ψ)" and insert -- T$_r$(Φ) --, therefor.

In Column 12, Line 24, delete "ΔΨ" and insert -- ΔΦ --, therefor.

In Column 12, Line 26, delete "T(Ψ) may be equal to T$_r$(Ψ) Ψ$_r$=Ψ+ΔΨ." and insert -- T(Φ) may be equal to T$_r$(Φ) Φ$_r$=Φ+ΔΦ. --, therefor.

In Column 12, Line 27, delete "ΔΨ" and insert -- ΔΦ --, therefor.

In Column 12, Line 30, delete "T(Ψ)" and insert -- T(Φ) --, therefor.

CERTIFICATE OF CORRECTION (continued)

In Column 13, Line 5, delete "is he" and insert -- is the --, therefor.

In Column 13, Line 14, delete "of the a" and insert -- of the --, therefor.

In Column 13, Line 47, delete "$W_a(\rho_a,\theta_a,\Psi_a)=W(\rho,\theta,\Psi)$" and insert -- $W_a(\rho_a,\theta_a,\Phi_a)=W(\rho,\theta,\Phi)$ --, therefor.

In Column 13, Line 54, delete "$$C_a(\theta) = \sum_{\rho_a} (\rho_a, \bar{\rho}_a) W(P_a, \theta_a, \Phi_a)$$" and insert -- $$C_a(\theta) = \sum_{\rho_a} (\rho_a - \bar{\rho}_a) W(\rho_a, \theta_a, \Phi_a)$$ --, therefor.

In Column 14, Line 1, delete "$C_a(\Psi)$" and insert -- $C_a(\Phi)$ --, therefor.

In Column 14, Line 24, delete "$T(\Psi)$ and $T_a(\Psi)$" and insert -- $T(\Phi)$ and $T_a(\Phi)$ --, therefor.

In Column 14, Line 27, delete "$T(\Psi)$" and insert -- $T(\Phi)$ --, therefor.

In Column 14, Line 27, delete "$T_a(\Psi)$" and insert -- $T_a(\Phi)$ --, therefor.

In Column 14, Line 30, delete "$T(\Psi)$." and insert -- $T(\Phi)$. --, therefor.

In Column 14, Line 37, delete "$T(\Psi)$" and insert -- $T(\Phi)$ --, therefor.

In Column 16, in Table 3, Line 3, delete "Daubecheis" and insert -- Daubechies --, therefor.